(12) United States Patent
Hunsaker (10) Patent No.: US 6,877,060 B2
(45) Date of Patent: Apr. 5, 2005

(54) DYNAMIC DELAYED TRANSACTION BUFFER CONFIGURATION BASED ON BUS FREQUENCY

(75) Inventor: Mikal C. Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 09/933,547

(22) Filed: Aug. 20, 2001

(65) Prior Publication Data

US 2003/0037198 A1 Feb. 20, 2003

(51) Int. Cl.$^7$ .............................................. G06F 13/36
(52) U.S. Cl. ........................ 710/310; 710/105; 710/56
(58) Field of Search ................................ 710/305, 306, 710/307, 310, 311, 105, 56, 300, 52, 51, 100, 313, 315, 316

(56) References Cited

U.S. PATENT DOCUMENTS

| | | | | |
|---|---|---|---|---|
| 4,006,466 A | * | 2/1977 | Patterson et al. ............. 710/48 |
| 4,684,829 A | * | 8/1987 | Uratani ....................... 326/106 |
| 4,947,366 A | * | 8/1990 | Johnson ......................... 710/3 |
| 5,533,204 A | * | 7/1996 | Tipley ........................ 710/108 |
| 5,535,340 A | * | 7/1996 | Bell et al. ................... 710/112 |
| 5,608,876 A | * | 3/1997 | Cohen et al. ................ 710/300 |
| 5,708,794 A | * | 1/1998 | Parks et al. ................. 711/154 |
| 5,815,677 A | * | 9/1998 | Goodrum ..................... 710/310 |
| 5,857,082 A | * | 1/1999 | Murdoch et al. ............ 710/310 |
| 5,870,567 A | * | 2/1999 | Hausauer et al. ........... 710/310 |
| 5,892,931 A | * | 4/1999 | Cohen et al. ................ 710/312 |
| 5,941,970 A | * | 8/1999 | Lange ......................... 710/314 |
| 5,991,833 A | * | 11/1999 | Wandler et al. ................ 710/52 |
| 6,047,349 A | * | 4/2000 | Klein .......................... 710/315 |
| 6,065,087 A | * | 5/2000 | Keaveny et al. ............. 710/315 |
| 6,067,590 A | * | 5/2000 | Pettey et al. ................. 710/100 |
| 6,073,201 A | * | 6/2000 | Jolley et al. ................. 710/315 |
| 6,081,863 A | * | 6/2000 | Kelley et al. ................ 710/312 |
| 6,175,889 B1 | * | 1/2001 | Olarig ......................... 710/309 |
| 6,247,161 B1 | * | 6/2001 | Lambrecht et al. ............. 716/1 |
| 6,266,731 B1 | * | 7/2001 | Riley et al. .................. 710/313 |
| 6,295,568 B1 | * | 9/2001 | Kelley et al. ................ 710/305 |
| 6,298,408 B1 | * | 10/2001 | Park ............................ 710/305 |
| 6,442,642 B1 | * | 8/2002 | Brooks ........................ 710/305 |
| 6,449,677 B1 | * | 9/2002 | Olarig et al. ................ 710/305 |
| 6,745,264 B1 | * | 6/2004 | Luke et al. .................... 710/52 |

OTHER PUBLICATIONS

Arthur J. Bernstein, David S. Gerst, Wai–Hong Leung, and Philip M. Lewis, "Design and Performance of an Assertional Concurrency Control System", 1998, University of New York at Stony Brook, Data Engineering, 1998. Proceedings., 14th International Conf..*

* cited by examiner

Primary Examiner—Mark H. Rinehart
Assistant Examiner—Justin I. King
(74) Attorney, Agent, or Firm—Blakely, Sokoloff, Taylor & Zafman LLP (57) ABSTRACT

An input circuit is coupled to a first bus to transfer a delayed transaction (DT) data having a transaction identifier to one of N buffers. The input circuit is dynamically configured according to a bus frequency. N is a positive integer. The one of the N buffers is associated with the transaction identifier. An output circuit is coupled to the buffers to transfer the DT data from the one of the N buffers to a second bus operating at the bus frequency. The output circuit is dynamically configured according to the bus frequency.

20 Claims, 5 Drawing Sheets

DYNAMIC DELAYED TRANSACTION BUFFER CONFIGURATION BASED ON BUS FREQUENCY

BACKGROUND

1. Field of the Invention

This invention relates to buffer circuits. In particular, the invention relates to dynamically configured buffer circuits.

2. Description of Related Art

Due to the long latency for a Peripheral Component Interconnect (PCI) or PCI-X read request from an inpu/output (I/O) device, a PCI/PCI-X bridge generally treats the inbound read transaction as a delayed transaction in PCI mode or a split transaction in PCI-X mode. A PCI delayed transaction occurs when the I/O device issues an initial read request. When the PCI bridge receives the read completion data, it stores in it in a delayed transaction buffer. When the PCI master returns with the same read request, the read completion data is provided from the delayed transaction buffer. Similarly, a PCI-X split transaction occurs when the I/O device issues an initial read request. Since the PCI-X bridge does not have the read data, it terminates the transaction with a Split Response indicating that the bridge has accepted the read request and will later provide the I/O device with the read completion data. When the bridge receives the read completion data, it stores it in a delayed transaction buffer. The bridge then sends the data to the I/O device as a Split Completion transaction.

A PCI/PCI-X bridge may support multiple concurrent delayed transactions if there are multiple I/O devices or a single I/O device with multiple read requests. In addition, the bus frequency may vary depending on system configurations. The PCI bus can operate at frequencies of 33 MHz or 66 MHz. The PCI-X bus can operate at frequencies of 66 MHz, 100 MHz, or 133 MHz. At these various frequencies, the number of read delayed transactions may be different which affect the depth of the delayed transaction buffer. Existing techniques for buffer management are inefficient. One technique uses a single large content addressable memory (CAM) delayed transaction buffer to support multiple delayed transactions. This technique requires a complex buffer management scheme and is costly. Another technique uses multiple delayed transaction buffers that are deep enough to handle the highest PCI/PCI-X bandwidth and lowest system latency. This technique requires high gate count and wastes hardware when used with lower bus frequencies.

Therefore, there is a need to have an efficient technique to handle multiple delayed transactions for various bus frequencies.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
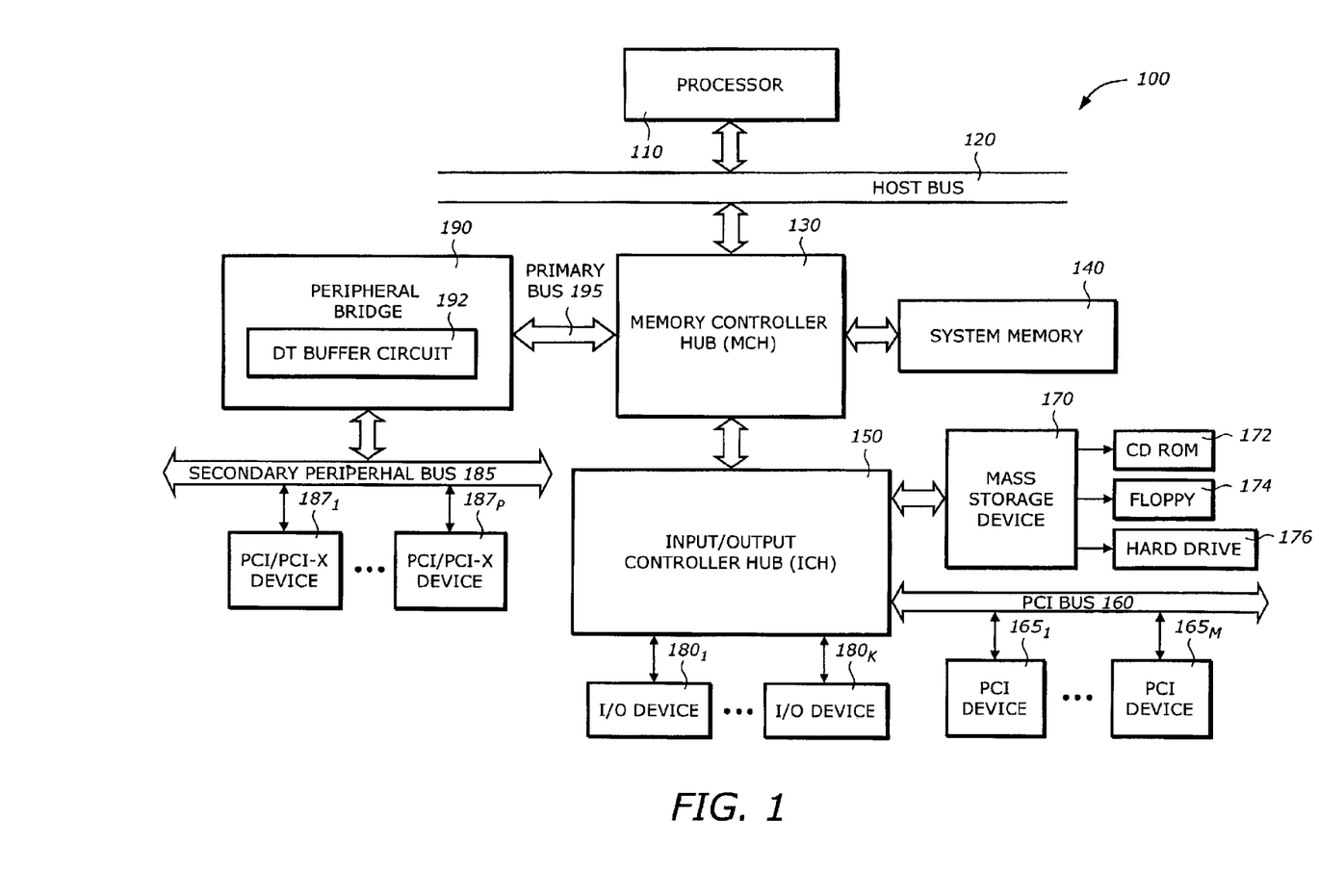
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a system memory 140, an input/output control hub (ICH) 150, a mass storage device 170, and input/output devices $180_1$ to $180_K$ and a peripheral bridge 190.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 typical contains a number of control registers to support memory management tasks such as virtual memory and cache memory. These tasks may include paging and segmentation.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140, the ICH 150, and the peripheral bridge 190. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. The ICH 150 has interface to the PCI bus 160. The PCI bus is coupled to M PCI devices $165_1$, to $165_M$.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The peripheral bridge 190 connects to the MCH 130 over a primary bus 195. The peripheral bridge is coupled to P PCI/PCI-X devices $187_1$ through $187_P$ through a secondary peripheral PCI/PCI-X bus 185. The secondary peripheral bus 185 can operate at frequencies of 33 MHz, 66 MHz, 100 MHz, and 133 MHz. The peripheral bridge 190 contains a delayed/split transaction (DT) buffer circuit 192 for servicing PCI/PCI-X reads.

The DT data may be requested by a delayed transaction read request from the PCI/PCI-X devices $187_1$ to $187_P$. The request may result in a delayed transaction (for PCI bus) or a split response (for PCI-X bus). The peripheral bridge 190 receives the read request from the PCI/PCI-X devices. The peripheral bridge 190 may not have the requested data and therefore returns an acknowledgment to the requesting device. Then, when the peripheral bridge 190 fetches the DT data from the memory 140, it stores the DT data in the buffer circuit 192 to be transferred to the PCI/PCI-X device via the PCI/PCI-X bus 185. Since the PCI/PCI-X bus may operate at one of several bus frequencies (e.g., 33 MHz, 66 MHz, 100 MHz, and 133 MHz), the number of read requests and the amount of requests may differ for various frequencies. The buffer circuit 135 is dynamically configured to accommodate the various frequencies.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 2:
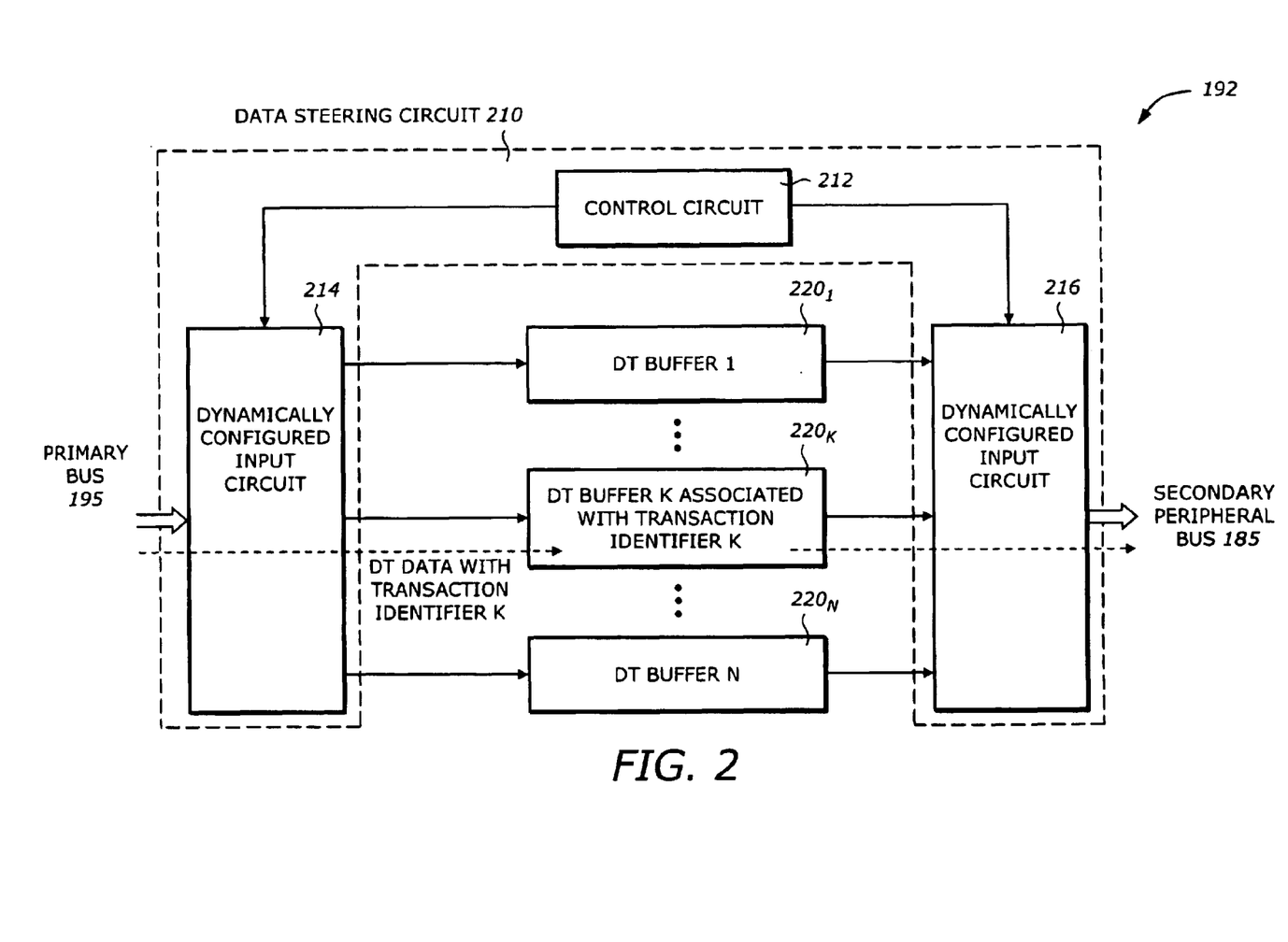
FIG. 2 is a diagram illustrating a buffer circuit shown in FIG. 1 according to one embodiment of the invention.

FIG. 2 is a diagram illustrating the buffer circuit 192 shown in FIG. 1 according to one embodiment of the invention. The buffer circuit 192 includes a data steering circuit 210 and N delayed transaction (DT) buffers $220_1$ to $220_N$.

The data steering circuit 210 provides the input and output data paths to the primary bus 195 as input and the peripheral secondary PCI/PCI-X bus 185 as output. The data steering circuit 210 is dynamically configured according to the frequency of the peripheral secondary bus 185. In addition, although the invention is described in terms of a delayed transaction read request from the I/O device to the memory, the concept can be readily applied or extended to similar situations where a dynamically configured buffering is needed. This includes a buffered write, a buffered read, etc. The data steering circuit 210 includes a control circuit 212, a dynamically configured input circuit 214, and a dynamically configured output circuit 216.

The control circuit 212 is a logic circuit that receives the bus frequency information and generates appropriate control signals to the input and output circuits 214 and 216. The control signals may include configuration bits and selection signals to the de-multiplexing and/or multiplexing circuits in the input and output circuits 214 and 216.

The input circuit 214 is interface primary bus 195 and the N DT buffers $220_1$ to $220_N$ at the input ports of these buffers. The input circuit 214 transfers a delayed transaction (DT) data having a transaction identifier to one of the N DT buffers $220_1$, to $220_N$ which is associated with that transaction identifier. The input circuit 214 is dynamically configured according to the bus frequency. The transaction identifier may be the address of the DT data, or any identifier employed by the chipset 190 to identify the transactions.

The output circuit 216 is interface to the secondary peripheral bus 185 and the N DT buffers $220_1$, to $220_N$ at the output ports of these buffers. The output circuit 216 transfers the delayed transaction (DT) data having a transaction identifier from one of the N DT buffers $220_1$, to $220_N$ which is associated with that transaction identifier to the secondary peripheral bus 185 to be received by the peripheral device that generates the read request. The output circuit 216 is dynamically configured according to the bus frequency. The transaction identifier may be the address of the DT data, or any identifier employed by the chipset 130 to identify the transactions.

The operating bus frequency may be low, medium, or high depending on the system design and configurations. The buffer circuit 192 may have a number of configurations to accommodate these frequencies. At lower frequencies (e.g., PCI bus at 33 and 66 MHz), the peripheral bus 185 may be able to support many PCI devices. This results in a need to support many concurrent DTs. In addition, since these DTs are from lower frequencies, large DT buffer depths are not required. On the other hand, at high bus frequencies (e.g., PCI-X bus at 100 MHz and 133 MHz), the peripheral bus may be only able to support fewer PCI devices. In addition, large DT buffer depths are necessary to buffer more data due to higher bus bandwidth. This results in fewer DT buffers, but each buffer has larger depth.

Figure 3A:
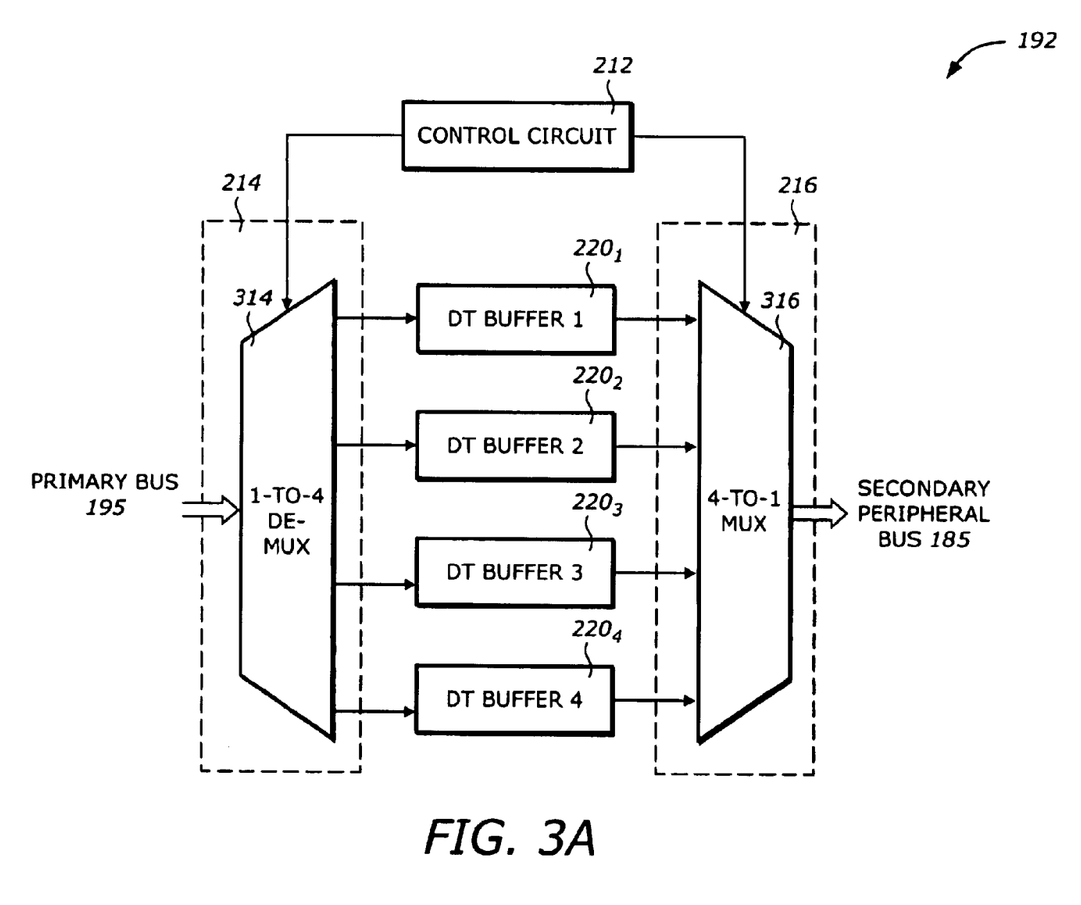
FIG. 3A is a diagram illustrating a buffer circuit configured for low bus frequencies according to one embodiment of the invention.
Figure 3B:
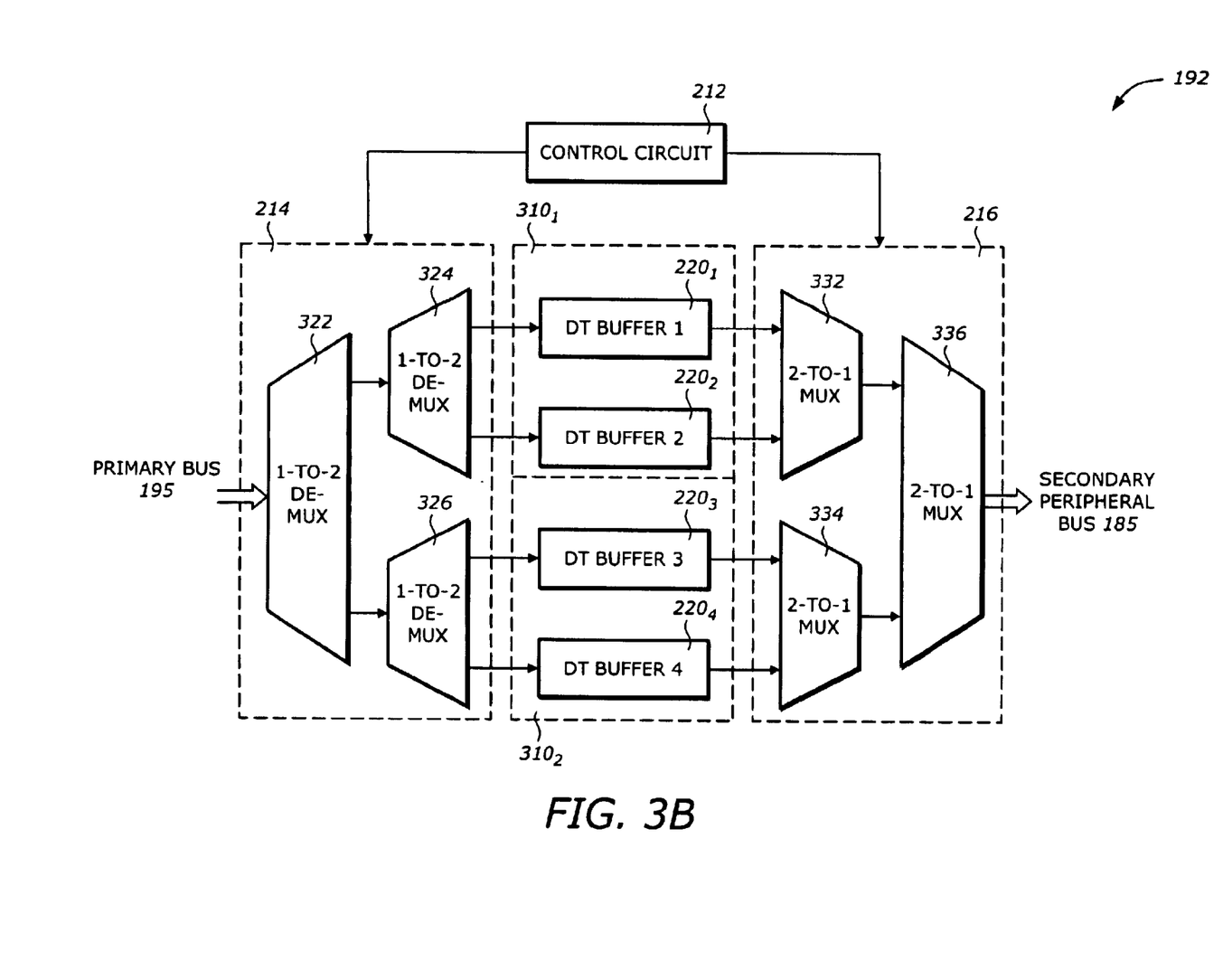
FIG. 3B is a diagram illustrating a buffer circuit configured for high bus frequencies according to one embodiment of the invention.

To configure the buffers to have large depth, the buffers can be grouped together and are accessed as if they form into a single contiguous buffer. For example, suppose there are N buffers, each having a depth of D, i.e., each buffer can store up to D data items. These buffers are then configured for the lowest bus frequencies where the number of buffers is the highest and the buffer depth is lowest. At higher frequencies, the N buffers may be divided into groups. For example, suppose it is desired to increase the buffer depth to 2*D and reduce the number of buffers to N/2, then N buffers may be grouped to form N/2 groups, each group having 2 buffers. The two buffers in each group are accessed in a ping-pong or alternate manner such that they operate like a single buffer having a depth of 2*D. In general, the N buffers may be formed into P groups, each group having Q buffers where Q=N/P and N, P, and Q are positive integers with P<N. The buffer circuit 192 may be dynamically configured to support any number of configurations. In one embodiment, there are two configurations: lower and higher bus frequencies. FIGS. 3A and 3B provide examples when N=4.

FIG. 3A is a diagram illustrating the buffer circuit 192 configured for lower bus frequencies according to one embodiment of the invention. In this example, there are four DT buffers $220_1$, to $220_4$ (N=4). The input circuit 214 includes a one-to-four demultiplexer (de-mux) 314. The output circuit 216 includes a four-to-one multiplexer (mux) 316.

The one-to-four de-mux 314 receives the DT data from the primary bus 195. Based on the transaction identifier, the control circuit 212 generates select signals to the de-mux 314 so that the data can be routed to the corresponding DT buffer. In addition, the control circuit 212 may also generate control signals to the corresponding DT buffer for a write or store operation.

When it is time to retrieve the DT data, the four-to-one mux 316 transfers the DT data from the DT buffer associated with the desired transaction identifier to the secondary peripheral bus 185 as requested. The control circuit 212 generates the control signals to the corresponding DT buffer for a read or load operation. In addition, the control circuit 212 generates select signals to the mux 316 so that the DT data read from the corresponding DT buffer can be routed to the secondary peripheral bus 185.

FIG. 3B is a diagram illustrating the buffer circuit 192 configured for higher bus frequencies according to one embodiment of the invention. In this example, there are four DT buffers $220_1$, to $220_4$ (N=4), and there are two groups (P=2), each group having two buffers (Q=2).

The input circuit 214 includes a one-to-two de-mux 322 and two one-to-two de-muxes 324 and 326. The output circuit 216 includes two two-to-one muxes 332 and 334 and a two-to-one mux 336. In general, when there are P groups, each group having Q buffers, the input circuit 214 includes a 1-to-P de-multiplexer and P 1-to-Q de-multiplexers. The 1-to-P de-multiplexer transfers the DT data to one of P signal paths. Each of the 1-to-Q de-multiplexers is coupled to Q of the N buffers to transfer the DT data to one of the Q buffers based on the transaction identifier. Similarly, the output circuit 216 includes P Q-to-1 multiplexers and a P-to-1 multiplexer. The P Q-to-1 multiplexers are coupled to Q of the N buffers to transfer the DT data from one of the Q buffers to P signal paths based on the transaction identifier. The P-to-1 multiplexer is coupled to the P Q-to-1 multiplexers via the P signal paths to transfer the DT data to the secondary peripheral bus 185.

The DT buffers $220_1$ to $220_4$ are formed into two groups $310_1$ and $310_2$, each group having two buffers. The group $310_1$ includes the DT buffers $220_1$ and $220_2$ and is interfaced to the one-to-two de-mux 324. The group $310_2$ includes the DT buffers $220_3$ and $220_4$ and is interfaced to the one-to-two de-mux 326. In this configuration, there are in essence two buffers and each buffer has twice the depth than that of FIG. 3A. The one-to-two de-mux 322 is controlled by the control circuit 212 to transfer the DT data to one of the two one-to-two de-muxes 324 and 326. Each of the one-to-two de-muxes 324 and 326 operates in a ping-pong or alternate manner to transfer the DT data to the proper DT buffer such that the DT buffer is not overflowed. For example, if the group 3101 is to store the DT data, then the one-to-two 324 de-mux stores the DT data into one of the buffers initially, say, DT buffer 1 $220_1$. When the DT buffer 1 $220_1$, is filled up, the one-to-two de-mux 324 switches to the DT buffer 2 $220_2$. The DT buffer 1 $220_1$, is available for reading. When the DT buffer 2 $220_2$ is filled up, presumably by that time the DT buffer 1 $220_1$, has be read at least partially, the one-to-two de-mux 324 switches back to the DT buffer 1 $^{220}{}_1$. To avoid overflow the buffers, the grouping and the depth of the buffers are selected in advance based on the maximum bus frequency and the statistics of the read requests from the I/O devices.

Similarly, when the DT data is read from the buffers, the control circuit 212 generates control signals to the output circuit 216 and the DT buffers. The two-to-one mux 336 selects the data from one of the two two-to-one muxes 332 and 334 according to the transaction identifier. The selected one of the muxes 332 and 334 then reads the corresponding group of buffers in a ping-pong or alternate manner. In other words, when one of the buffer is empty, indicating that all data have been read, the selected mux then reads the other buffer, presumably by that time has been filled with DT data at least partially.

Figure 4:
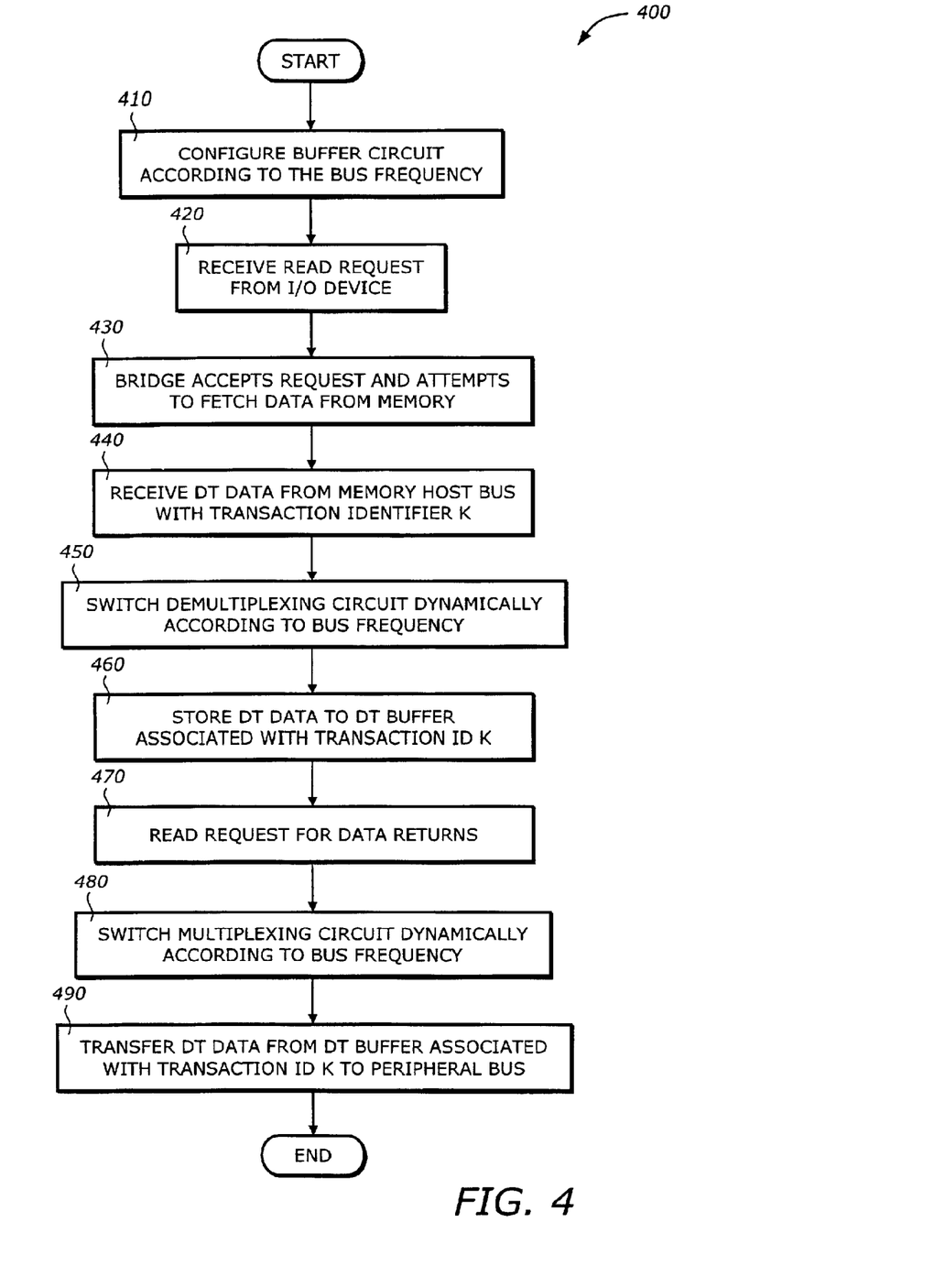
FIG. 4 is a flowchart illustrating a process to Delayed Transaction (DT) data buffer according to one embodiment of the invention.

FIG. 4 is a flowchart illustrating a process 400 to buffer DT data according to one embodiment of the invention.

Upon START, the process 400 configures the buffer circuit according to the bus frequency (Block 410). The configuration may be performed by writing a configuration word in a register which sets up the control circuit. Then, the process 400 receives a read request from the I/O device (Block 420). Next, the chipset bridge accepts the request and attempting to fetch data from the memory (Block 430). Then, the process 400 receives the DT data from the memory or host bus with a transaction identifier K (Block 440).

Next, the process 400 switches the de-multiplexing circuit in the input circuit dynamically according to the bus frequency (Block 450). Then, the process 400 stores the DT data to the DT buffer associated with the transaction identifier (Block 460). When there is time to read the DT data, or when the read request for data returns (Block 470), the process 400 switches the multiplexing circuit in the output circuit according to the bus frequency (Block 480). Next, the process 400 transfers the DT data from the DT buffer associated with the transaction identifier K to the peripheral bus and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   an input circuit coupled to a first bus to transfer a delayed transaction (DT) data having a transaction identifier to one of N buffers, the input circuit being dynamically configured according to a bus frequency, N being a positive integer, the one of the N buffers being associated with the transaction identifier, the input circuit comprising a 1-to-N de-multiplexing circuit to transfer the DT data from the first bus to the one of the N buffers based on the transaction identifier; and
   an output circuit coupled to the buffers to transfer the DT data from the one of the N buffers to a second bus operating at the bus frequency, the output circuit being dynamically configured according to the bus frequency, the output circuit comprising a N-to-1 multiplexing circuit to transfer the DT data from the one of the N buffers to the second bus based on the transaction identifier; wherein the 1-to-N de-multiplexing circuit comprises:
   a 1-to-P de-multiplexer to transfer the DT data to one of P signal paths, P being a positive integers; and
   P 1-to-Q de-multiplexers coupled to the P signal paths, Q being equal to N/P, each of the 1-to-Q de-multiplexers being coupled to Q of the N buffers to transfer the DT data to one of the Q buffers based on the transaction identifier.

2. The apparatus of claim 1 wherein each of the P 1-to-Q de-multiplexers transfers the DT data to the one of the Q buffers alternately.

3. The apparatus of claim 1 wherein the N-to-1 multiplexing circuit comprises:
P Q-to-1 multiplexers coupled to Q of the N buffers to transfer the DT data from one of the Q buffers to P signal paths based on the transaction identifier; and
a P-to-1 multiplexer coupled to the P Q-to-1 multiplexers via the P signal paths to transfer the DT data to the second bus.

4. The apparatus of claim 3 wherein each of the P Q-to-1 multiplexers transfers the DT data to the one of the Q buffers alternately.

5. The apparatus of claim 1 wherein the first bus is a primary bus coupled to a memory.

6. The apparatus of claim 1 wherein the second bus is one of a Peripheral Component Interconnect (PCI) bus and a PCI-X bus.

7. The apparatus of claim 6 wherein the delayed transaction data corresponds to a split transaction data when the second bus is the PCI-X bus.

8. A method comprising:
transferring a delayed transaction (DT) data having a transaction identifier to one of N buffers using an input circuit coupled to a first bus, the input circuit being dynamically configured according to a bus frequency, N being a positive integer, the one of the N buffers being associated with the transaction identifier, transferring the DT data to the one of N buffers comprising transferring the DT data from the first bus to the one of the N buffers based on the transaction identifier using a 1-to-N de-multiplexing circuit; and
transferring the DT data from the one of the N buffers to a second bus operating at the bus frequency using an output circuit the output circuit being dynamically configured according to the bus frequency, transferring the DT data from the one of the N buffers comprising transferring the DT data from the one of the N buffers to the second bus based on the transaction identifier using a N-to-1 multiplexing circuit; wherein transferring the DT data using the 1-to-N de-multiplexing circuit comprises:
transferring the DT data to one of P signal paths using a 1-to-P de-multiplexer, P being a positive integers; and
transferring the DT data to one of Q of the N buffers based on the transaction identifier using P 1-to-Q de-multiplexers coupled to the P signal paths, Q being equal to N/P, each of the 1-to-Q de-multiplexers being coupled to the Q buffers.

9. The method of claim 8 wherein transferring the DT data to one of the Q buffers comprises transferring the DT data to the one of the Q buffers alternately using each of the P 1-to-Q de-multiplexers.

10. The method of claim 8 wherein transferring the DT data from the one of the N buffers using the N-to-1 multiplexing circuit comprises:
transferring the DT data from one of the Q buffers to P signal paths based on the transaction identifier using P Q-to-1 multiplexers coupled to Q of the N buffers; and
transferring the DT data to the second bus using a P-to-1 multiplexer coupled to the P Q-to-1 multiplexers via the P signal paths.

11. The method of claim 10 wherein transferring the DT data to the second bus using a P-to-1 multiplexer comprises transferring the DT data to the one of the Q buffers alternately using each of the P Q-to-1 multiplexers.

12. The method of claim 8 wherein the first bus is a primary bus coupled to a memory.

13. The method of claim 8 wherein the second bus is one of a Peripheral Component Interconnect (PCI) bus and a PCI-X bus.

14. The method of claim 13 wherein the delayed transaction data corresponds to a split transaction data when the second bus is the PCI-X bus.

15. A system comprising:
a processor having a host bus;
a memory having a first bus;
a chipset coupled to the processor via the host bus and to the memory via the first bus to control accesses to the memory from a device via a second bus operating at a bus frequency, the chipset having a buffer circuit, the buffer circuit comprising:
an input circuit coupled the a first bus to transfer a delayed transaction (DT) data having a transaction identifier to one of N buffers, the input circuit being dynamically configured according to the bus frequency, N being a positive integer, the one of the N buffers being associated with the transaction identifier, the input circuit comprising a 1-to-N de-multiplexing circuit to transfer the DT data from the first bus to the one of the N buffers based on the transaction identifier; and
an output circuit coupled to the buffers to transfer the DT data from the one of the N buffers to the second bus, the output circuit being dynamically configured according to the bus frequency, the output circuit comprising a N-to-1 multiplexing circuit to transfer the DT data from the one of the N buffers to the second bus based on the transaction identifier;
wherein the 1-to-N de-multiplexing circuit comprises:
a 1-to-P de-multiplexer to transfer the DT data to one of P signal paths, P being a positive integers; and
P 1-to-Q de-multiplexers coupled to the P signal paths, Q being equal to N/P, each of the 1-to-Q de-multiplexers being coupled to Q of the N buffers to transfer the DT data to one of the Q buffers based on the transaction identifier.

16. The system of claim 15 wherein each of the P 1-to-Q de-multiplexers transfers the DT data to the one of the Q buffers alternately.

17. The system of claim 15 wherein the N-to-1 multiplexing circuit comprises:
P Q-to-1 multiplexers coupled to Q of the N buffers to transfer the DT data from one of the Q buffers to P signal paths based on the transaction identifier; and
a P-to-1 multiplexer coupled to the P Q-to-1 multiplexers via the P signal paths to transfer the DT data to the second bus.

18. The system of claim 17 wherein each of the P Q-to-1 multiplexers transfers the DT data to the one of the Q buffers alternately.

19. The system of claim 15 wherein the second bus is one of a Peripheral Component Interconnect (PCI) bus and a PCI-X bus.

20. The system of claim 19 wherein the delayed transaction data corresponds to a split transaction data when the second bus is the PCI-X bus.

* * * * *

UNITED STATES PATENT AND TRADEMARK OFFICE
CERTIFICATE OF CORRECTION

PATENT NO. : 6,877,060 B2
DATED : April 5, 2005
INVENTOR(S) : Hunsaker

It is certified that error appears in the above-identified patent and that said Letters Patent is hereby corrected as shown below:

Column 1,
Line 12, delete "inpu/" and insert -- input/ --.

Column 7,
Line 34, delete the first occurrence of "circuit" and insert -- circuit, --.

Signed and Sealed this

Nineteenth Day of July, 2005

JON W. DUDAS
*Director of the United States Patent and Trademark Office*